United States Patent
Brashears et al.

(10) Patent No.: US 7,513,280 B2
(45) Date of Patent: Apr. 7, 2009

(54) APPARATUS AND METHODS FOR DISCHARGING PARTICULATE MATERIAL FROM STORAGE SILOS

(75) Inventors: David F. Brashears, Orlando, FL (US); Jerry J. Walker, Maitland, FL (US)

(73) Assignee: Gencor Industries Inc., Orlando, FL (US)

( * ) Notice: Subject to any disclaimer, the term of this patent is extended or adjusted under 35 U.S.C. 154(b) by 723 days.

(21) Appl. No.: 10/986,278

(22) Filed: Nov. 12, 2004

(65) Prior Publication Data
US 2006/0102664 A1 May 18, 2006

(51) Int. Cl.
B65B 1/04 (2006.01)
(52) U.S. Cl. .............................. 141/104; 141/9; 141/94; 141/100; 52/197; 414/328
(58) Field of Classification Search ............... 141/2, 141/9, 18, 94, 100, 104, 234, 238; 52/197; 414/328, 329
See application file for complete search history.

(56) References Cited

U.S. PATENT DOCUMENTS 2,661,876 A * 12/1953 Kindseth, V ................. 222/504
2,663,466 A * 12/1953 Heltzel ........................ 222/505
2,893,602 A * 7/1959 Heacock et al. ............... 222/77
3,380,475 A * 4/1968 Armstrong ................... 137/885
3,746,313 A * 7/1973 Weeks et al. ................... 366/19
3,911,975 A * 10/1975 van Soestbergen et al. ..... 141/95
4,004,619 A * 1/1977 Eddlemon et al. ............. 141/11
4,460,308 A * 7/1984 Moon et al. .................. 414/808
5,108,010 A 4/1992 Murray
5,215,372 A * 6/1993 Milstead ....................... 366/18
5,634,716 A * 6/1997 Westall et al. ................ 366/141
5,799,825 A * 9/1998 Dillman ........................ 222/1
5,881,780 A * 3/1999 Matye et al. ................. 141/232
6,196,279 B1 * 3/2001 Baker ........................... 141/98

* cited by examiner

Primary Examiner—Timothy L Maust
(74) Attorney, Agent, or Firm—Nixon & Vanderhye P.C.

(57) ABSTRACT

The silo includes at least three hoppers terminating in rectilinear discharge openings extending lengthwise transversely of a loading area below the discharge openings. Clam gates are movable between open and closed positions to discharge material. The discharge area at the bottom of the silo is increased, facilitating faster loading of trucks with the particulate material.

15 Claims, 12 Drawing Sheets

APPARATUS AND METHODS FOR DISCHARGING PARTICULATE MATERIAL FROM STORAGE SILOS

BACKGROUND OF THE INVENTION

The present invention relates to a silo for storing particulate material, e.g., hot asphaltic mix for use in paving and particularly relates to a discharge gate system for discharging the material from the silo into trucks wherein the gate system and the truck loading area are specifically oriented relative to one another.

Silos for receiving, storing and discharging particulate materials, for example, hot asphaltic mix, are typically employed before delivery of the materials to an end user for a number of different reasons. For example, batch asphalt plants utilize storage silos for temporarily storing the asphaltic mix and this enables the plant to run at a more consistent rate which effectively improves plant productivity. For drum mix plants where the product, e.g., hot asphalt mix, is made continuously, silos effectively provide for surge capacity. Thus, silos enable the drum mix plant to operate continuously to produce the asphaltic mix while trucks deliver the asphaltic mix on a batch basis. Additionally, multiple silos are used to make available different types of mixes without having to switch mix designs on the production units. Also, since a mix is already made and can be dispensed as needed from a silo, trucks can be loaded with the asphaltic mix from the silo much faster for delivery to the end user. Further, silos enable the storage of the material for limited periods of time such as overnight so that the mix will be available early in the morning.

Storage silos, however, introduce several problems between the production of the mix and its delivery to an end user. Segregation of the mix, i.e., separation of larger aggregate from smaller aggregate in the mix, can occur in the silo due to flow differences between different sized aggregates. This may result in providing an end user with a non-uniform mix. Further, single outlet silos may produce tunneling, i.e., "rat holing," of the mix flowing through the silo. That is, the material in the center of the silo may discharge along with the material above it leaving the material closer to the outer walls stagnant. This can contribute to the problem of segregation as well as other problems. Also, when storing asphaltic mix in a silo, oxygen may tend to migrate into the silo and oxidize the mix creating hardened aggregate chunks which will plug the silo and/or cause quality issues when using the asphaltic mix in a paving operation.

Additionally, the problem of segregation of the aggregate is also influenced by the speed in which each truck is loaded with mix from the silo. For example, when a truck is located in the loading area under the silo with a single discharge outlet, and not moved during loading, the discharge provides a mix sensitive to segregation. That is, larger stones may roll to the front, to the rear and to each side of the truck leaving coarse material about the periphery of the pile and a fine mix in the middle of the pile loaded onto the truck bed. This coarse material then is the first and last material to be discharged from the truck bed. The coarse material may then be trapped in the wings of the paver resulting in coarse areas of pavement between each load. To prevent this type of segregation during loading, it is common practice in single outlet silos to provide three separate discharges from the silo into each truck. For example, the first discharge may be made directly adjacent the front of the truck bed, the second discharge directly adjacent the tailgate and the third discharge in the center. By using this method, coarse material is forced to roll to the middle of the truck bed and then is covered up by the last discharge, thereby rendering greater uniformity of the aggregate material when discharged from the truck. These discrete steps and movements of the truck slow the loading process although they provide some assurance that the load dumped from the truck will be substantially uniform with the coarse material intermixed. Thus, there has developed a need for a system for discharging particulate material from storage silos which will avoid the foregoing and other problems associated with prior silo discharge systems.

BRIEF DESCRIPTION OF THE INVENTION

In a preferred embodiment of the present invention, there is provided storage and discharge apparatus for particulate material, comprising a silo; at least three hoppers adjacent a lower end of the silo with each hopper being in the form of an inverted, four-sided frustum terminating in a generally rectilinear bottom discharge opening; the openings being generally parallel to one another and being spaced from one another in a direction normal to length directions of the openings; and a gate for each opening movable between open and closed positions.

In a further preferred embodiment of the invention, there is provided apparatus for storing and discharging hot asphaltic mix comprising a silo having at least three generally rectilinear hoppers adjacent a lower end of the silo, terminating in generally rectilinear openings at respective lower ends thereof, each hopper including a pair of opposed flat sides extending along the length of the hopper and inclined toward one another in a downward direction and a pair of flat ends extending between the flat sides and inclined toward one another in a downward direction; the openings being generally parallel to one another and being spaced from one another in a direction normal to length directions of the hoppers; a gate for each opening movable between open and closed positions for respectively discharging the hot mix from the silo and maintaining the hot mix within the silo.

In another preferred embodiment of the invention, there is provided apparatus for storing and discharging hot asphaltic mix, comprising a silo; at least one hopper adjacent a lower end of the silo and terminating in a bottom discharge opening; a gate for the opening movable between open and closed positions, the gate including an elongated arcuate closure member pivotally carried by the silo for movement between the open and closed positions, and fluid actuated cylinders coupled to the member for moving the member between the open and closed positions; a safety gate below the opening and the gate member including a port in the safety gate for insertion of a rod through the port and into the opening when the closure member lies in an open position to enable break-up of material plugging the opening by manipulation of the rod.

In another preferred embodiment of the invention, there is provided apparatus for storing and discharging particulate material, comprising a silo; at least one hopper adjacent a lower end of the silo and terminating in a bottom discharge opening; a gate for the opening movable between open and closed positions; the silo, the hopper, the opening and the gate being elevated above a loading area for discharging particulate material into a bed of a truck; a lighting system for transmitting a pattern of light from the lower end of the silo into the truck bed, the light pattern being outside a discharge envelope defined by the opening and indicating, when projected onto the truck bed, a proper location of the truck in the loading area to receive the particulate material into the truck bed.

In still another preferred embodiment of the invention, there is provided a method for storing and discharging asphaltic mix from a silo comprising the steps of providing a cylindrical silo for storing the asphaltic mix; forming at least three hoppers adjacent a lower end of the silo with peripheral confines of each hopper being defined by an inverted four-sided frustum terminating in a generally elongated rectilinear bottom discharge opening; providing a generally rectilinear truck loading area below the silo and the openings with a length direction thereof perpendicular to the length directions of the hoppers and the openings; and opening gates normally closing the openings to discharge the asphaltic mix from the silo and hoppers through the openings into a receiver such as a truck bed disposed in the loading area.

DETAILED DESCRIPTION OF THE INVENTION

Figure 1:
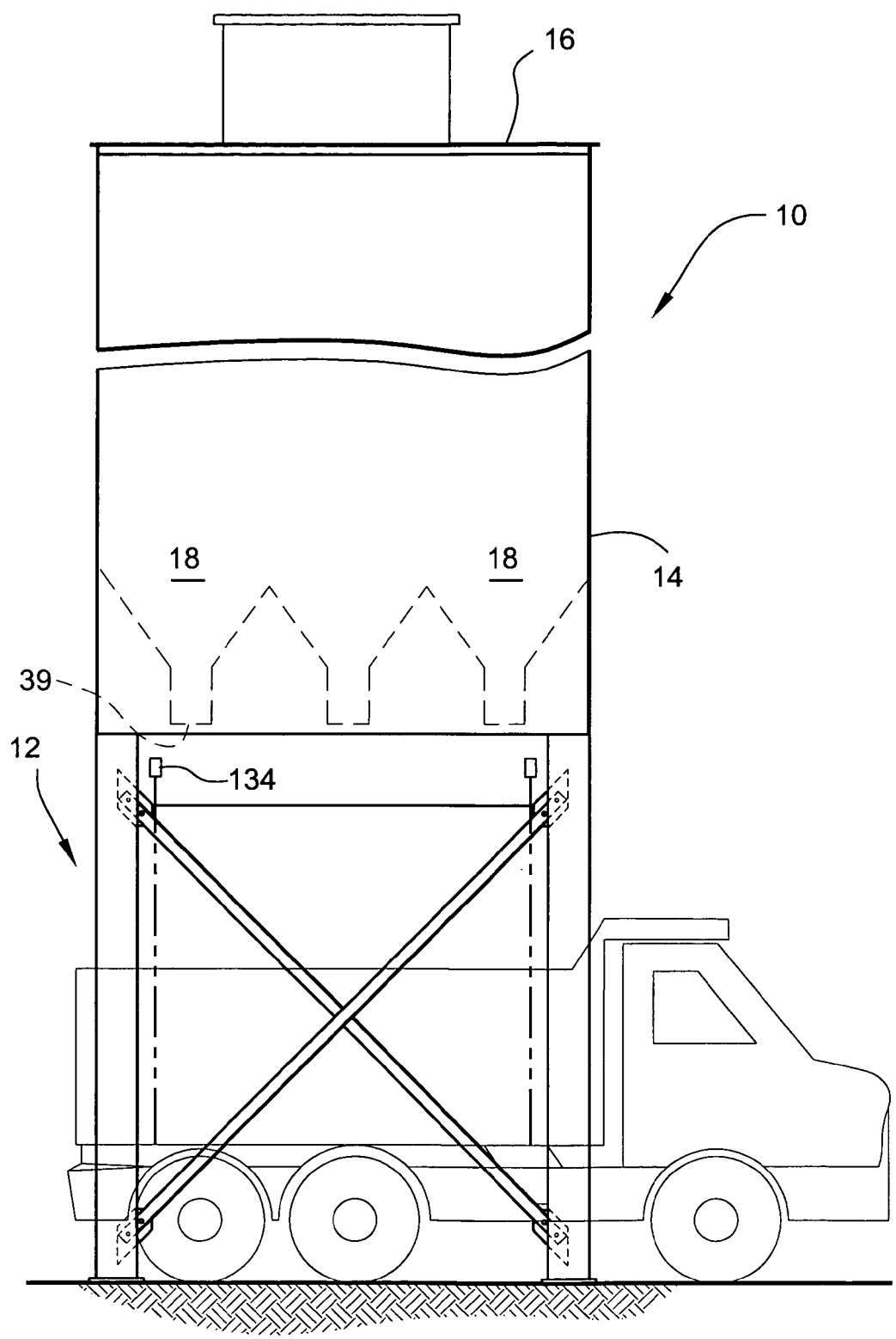
FIG. 1 is a side elevational view of a silo for discharging particulate material into a truck bed in a loading area below the silo.

Referring now to the drawings, particularly to FIG. 1, there is illustrated a silo generally designated 10 for receiving, storing and discharging particulate material, e.g., asphaltic cement or mix, with discharge openings elevated above a truck loading area, generally designated 12. Silo 10 includes a generally cylindrical housing 14 having an upper section 16 on which is mounted one or more batcher hoppers, not shown, for feeding particulate material, e.g., asphaltic mix, into silo 10. Batcher hoppers are conventional in the prior art. Suffice to say that the particulate material, for example, asphaltic mix, is fed by conveyors, also not shown, from a batch or drum mix plant and loaded through the batcher hoppers into silo 10.

It will also be appreciated that, while a cylindrical silo is illustrated and preferred, square or rectangular silos may be employed. In the past, such rectilinear silos had problems with segregation of the material. However, with the triple gate design, subsequently described herein in detail, the material in the corners of the rectilinear silos would remain sufficiently active to minimize or eliminate segregation. Also, for a given silo height, rectilinear shaped silos provide greater storage capacity for the same silo height.

Figure 3:
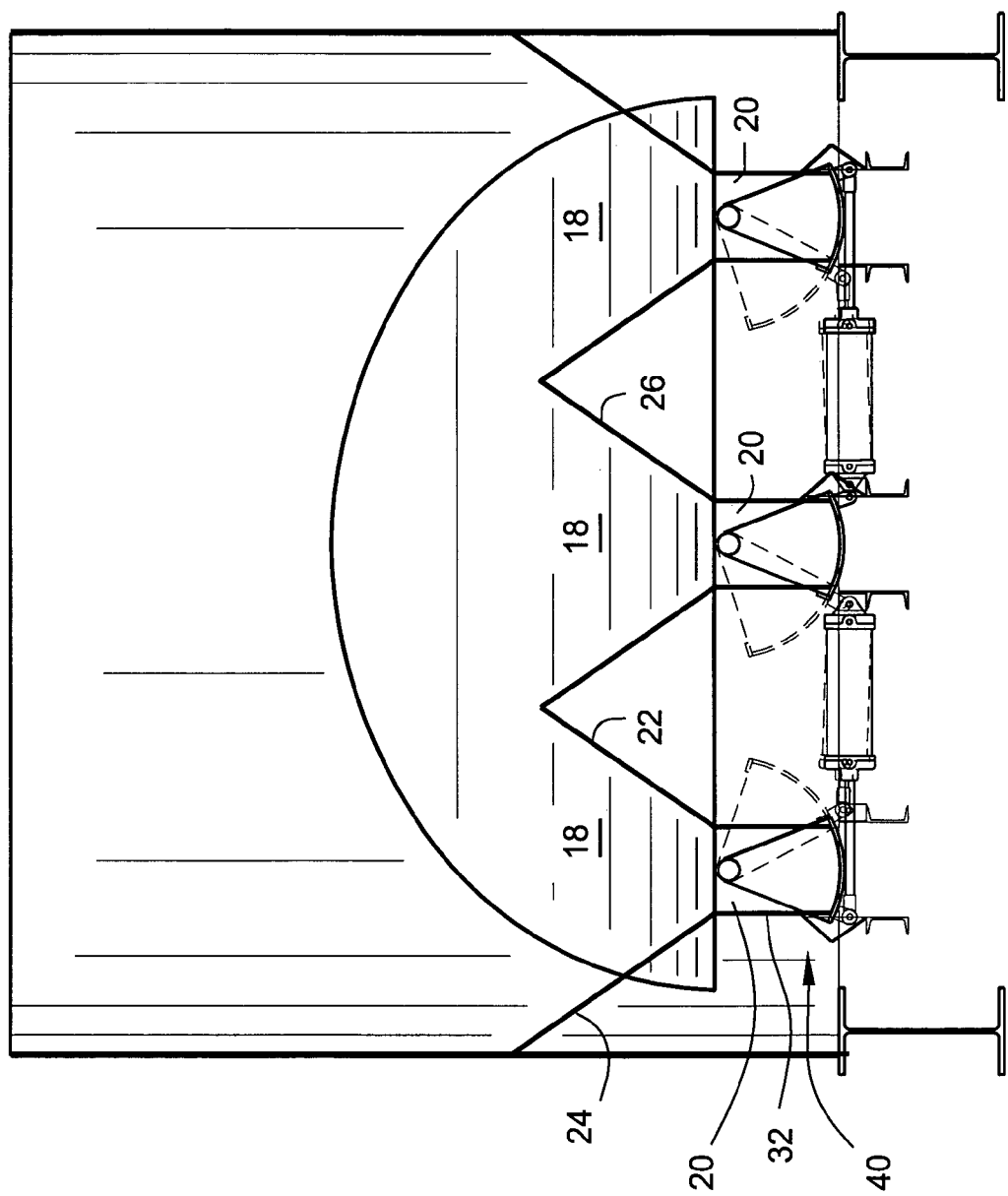
FIG. 3 is a fragmentary enlarged side elevational view of a bottom of the silo illustrating a discharge system.
Figure 4:
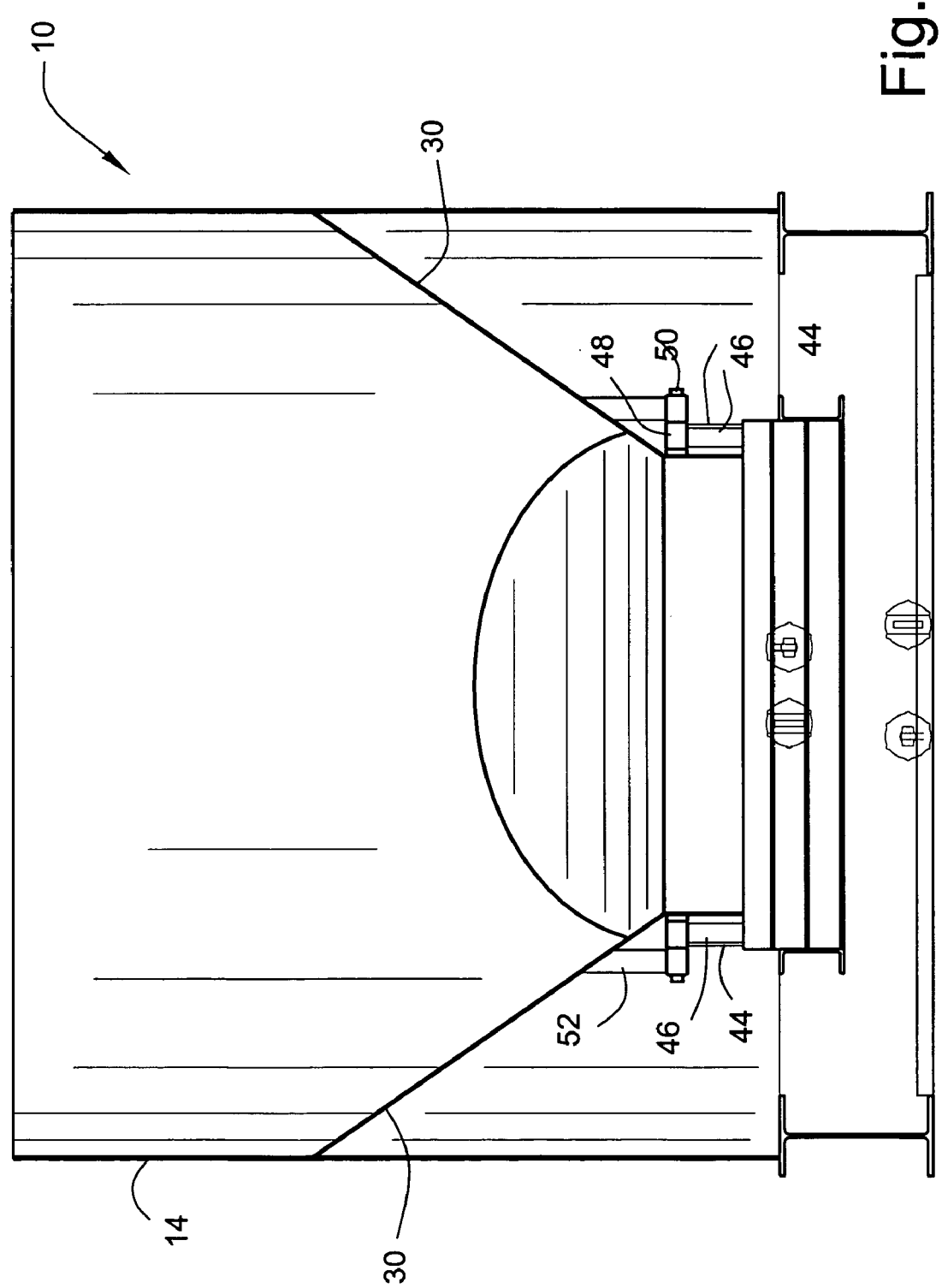
FIG. 4 is a fragmentary front elevational view of the discharge system.
Figure 5:
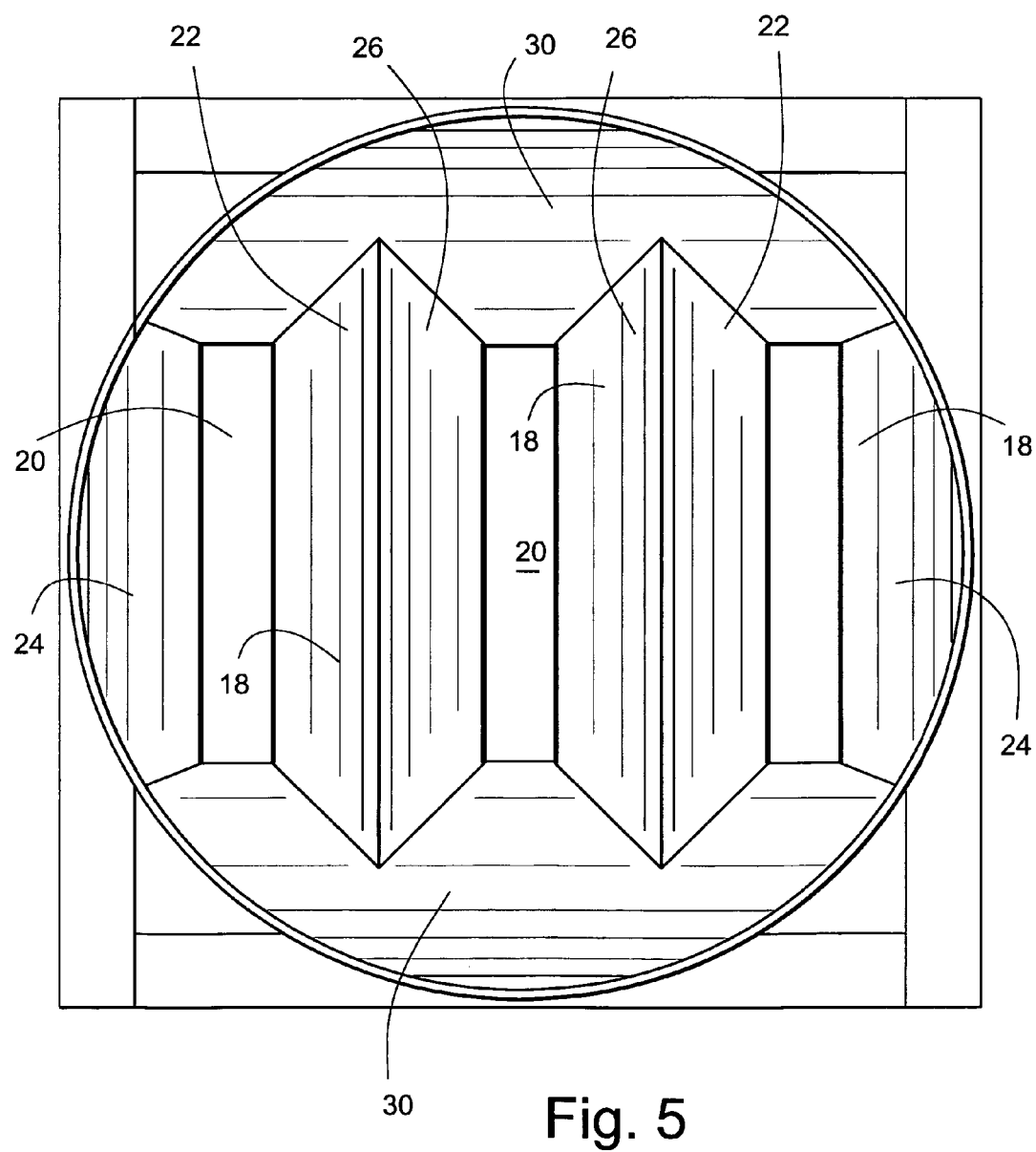
FIG. 5 is a plan view from inside the silo illustrating the discharge openings and the flat plates defining the hoppers.
Figure 5A:
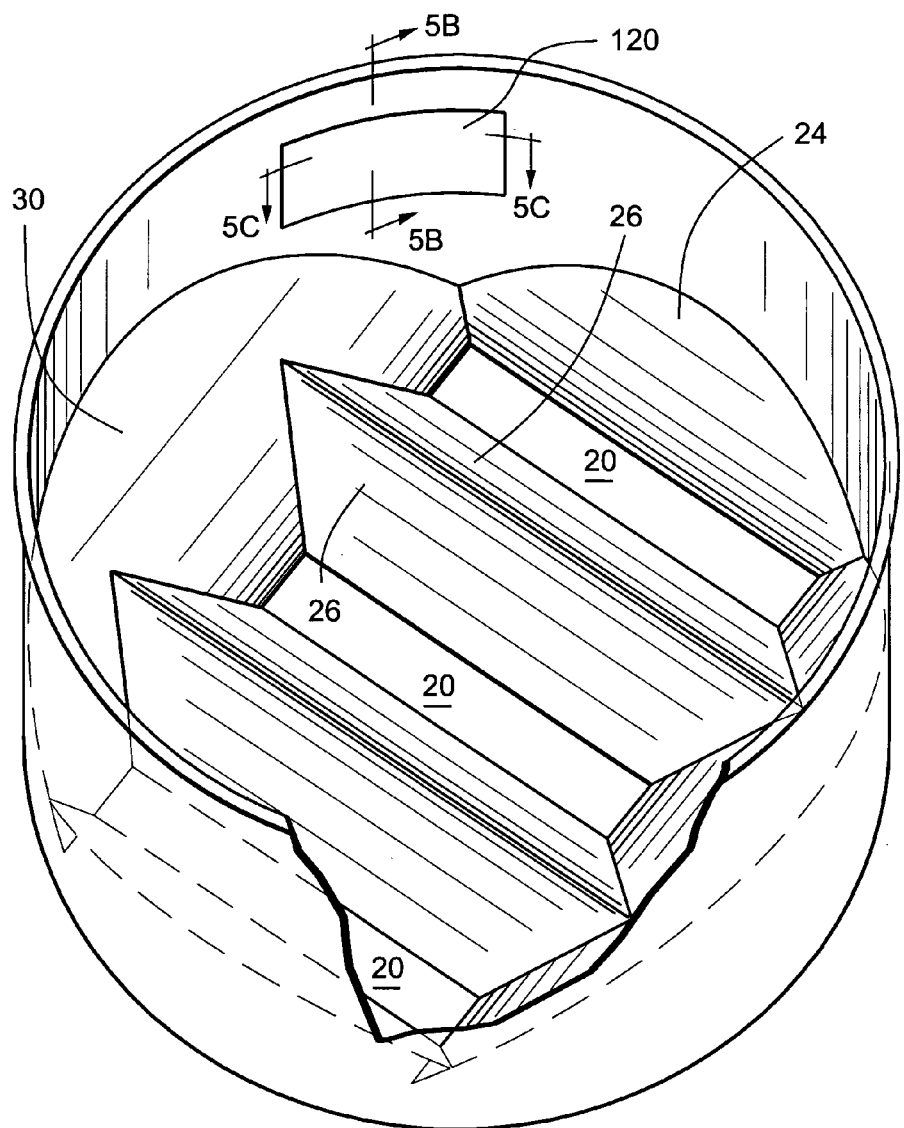
FIG. 5A is a fragmentary perspective view of the silo illustrating the hoppers and openings adjacent the bottom of the silo.
Figure 6:
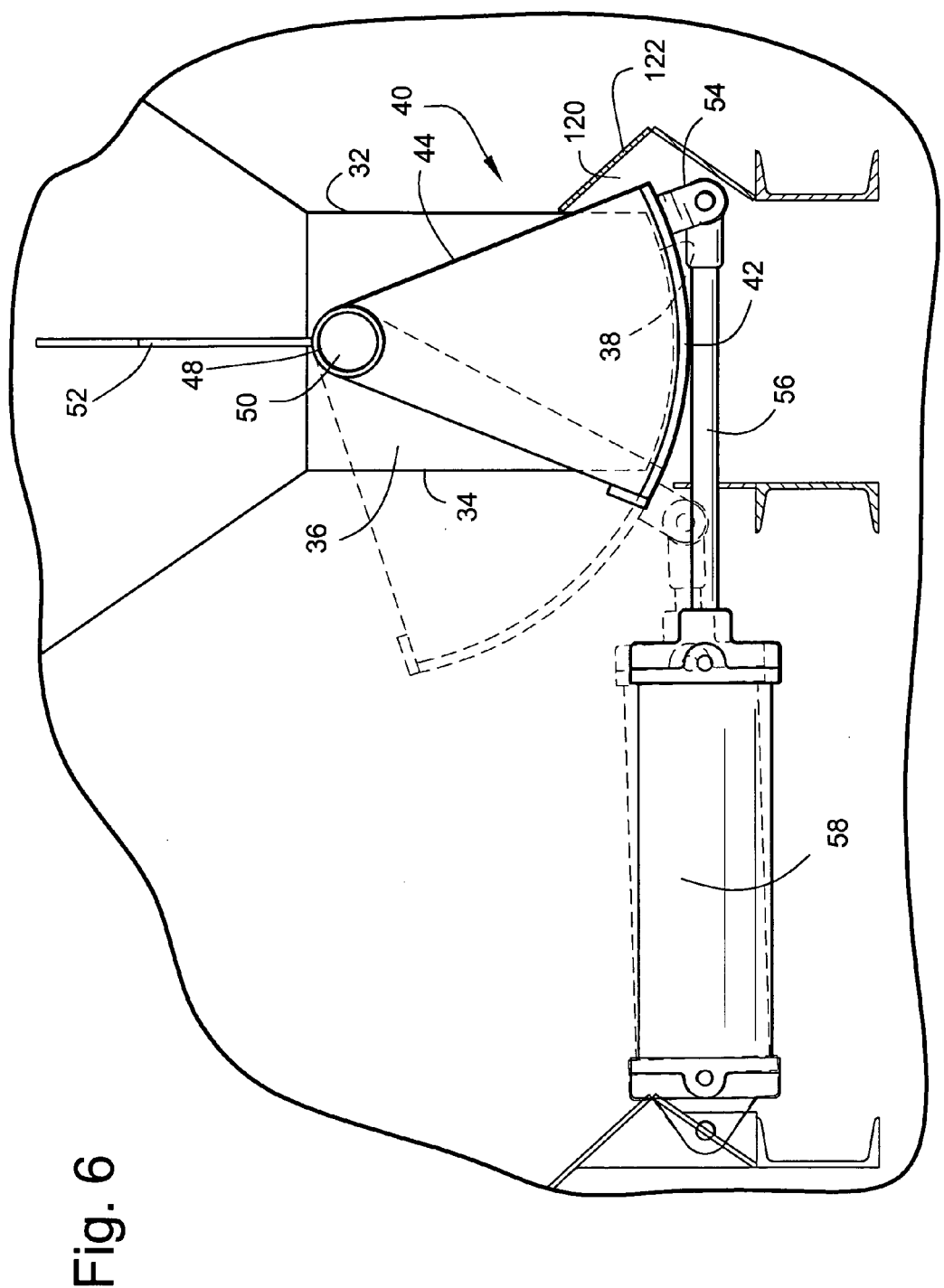
FIG. 6 is a fragmentary enlarged side elevational view illustrating a fluid actuator for a clam type gate.

Referring to FIGS. 3-5 and 5A, the bottom or lower end of silo 10 has at least three hoppers 18, each having a separate, generally rectilinear hopper opening 20. Instead of employing a conical bottom on the silo, as typical in the prior art, the hoppers 18 are defined by flat plates oriented in the silo bottom arranged to increase the capacity of the silo and to minimize or eliminate the potential for segregation of particulate material within the silo 10. As best illustrated in FIG. 5, each hopper 18 is formed by four flat inclined plates. The outboard hoppers are defined in part by two flat plates 22 and 24 which extend in the lengthwise direction of the rectilinear openings 20. Plates 22 and 24 are inclined downwardly toward one another. The central hopper 18 is defined in part by two flat plates 26 identical to one another, plates 26 being downwardly inclined toward the central opening 20 and toward one another. As illustrated, plates 24 are flat and have upper arcuate edges for joining, e.g., by welding, to the cylindrical side walls of the silo. Flat end plates 30 are provided adjacent opposite ends, respectively, of the openings 20 of the hoppers and complete the formation of the hoppers 18. Thus, each plate 30 serves as a common end plate for the hoppers and has an arcuate upper edge for securement, e.g., by welding, to the cylindrical side walls of the silo 10. Accordingly, each hopper 18 is bounded by generally rectilinear side plates and end plates and terminates in the rectilinear opening 20. As illustrated in FIG. 3, each opening 20 is further defined by a vertically downwardly extending chute 32 comprised of flat elongated side plates 34 and end plates 36 (FIG. 6). The chutes 32 terminate in generally rectilinear lower chute openings 39 (FIG. 1) having the same rectilinear size as hopper openings 20. The lower edges 38 (FIG. 6) of the chute end plates 36 are arcuate to accommodate the preferred clam type gates.

It will be appreciated that generally rectilinear linearly movable gates may be used in lieu of the clam type gates described and illustrated herein. Clam type gates, however, are preferred. Accordingly, each hopper opening 20 and particularly each chute opening 39 along the lower edges of the chute 32, is provided a clam type gate generally indicated 40. Each gate 40, as best illustrated in FIG. 6, includes an elongated arcuate member 42 having a concave upper surface in registration with the chute 32. Generally triangularly shaped end plates 44 are disposed outboard of the end plates 36 of chutes 32. Bars 46 (FIG. 4) at the opposite ends of the gate and inside of the end plates 44 are coupled between plate members 42 and pipes 48 pivotally mounted on pins 50. Pins 50 are, in turn, structurally supported by supports 52 secured to the flat plate 30 of the silo. As illustrated in FIG. 6, the member 42 is arcuate, concave in an upward direction, and follows the arcuate edges 38 of the end plates 36 of the chutes 32. A clevis 54 extends from the forward underside of each arcuate member 42 and is pivotally coupled to a rod 56 forming part of an actuator such as fluid actuated cylinder 58. Cylinder 58 is preferably an air cylinder. It will be appreciated that extension of rod 56 from cylinder 58 pivots the gate 40 into a closed position vis-à-vis the hopper and chute openings 20 and 39, respectively, and an open position by retraction of the rod 56, the open position being illustrated by the dash lines in FIG. 6. Each of the gates is independently actuated relative to the other gates by actuation of the associated actuator.Consequently, all of the gates 40 may be opened simultaneously, enabling a fast discharge of the particulate material from the silo into the bed of the truck in the loading area below the discharge gates. Also, by independently operating the gates, the gates can be opened in any sequence or combination as desired, e.g., a fast fill, with the outside pair of gates and a top-off using only the central discharge hopper.

Figure 7:
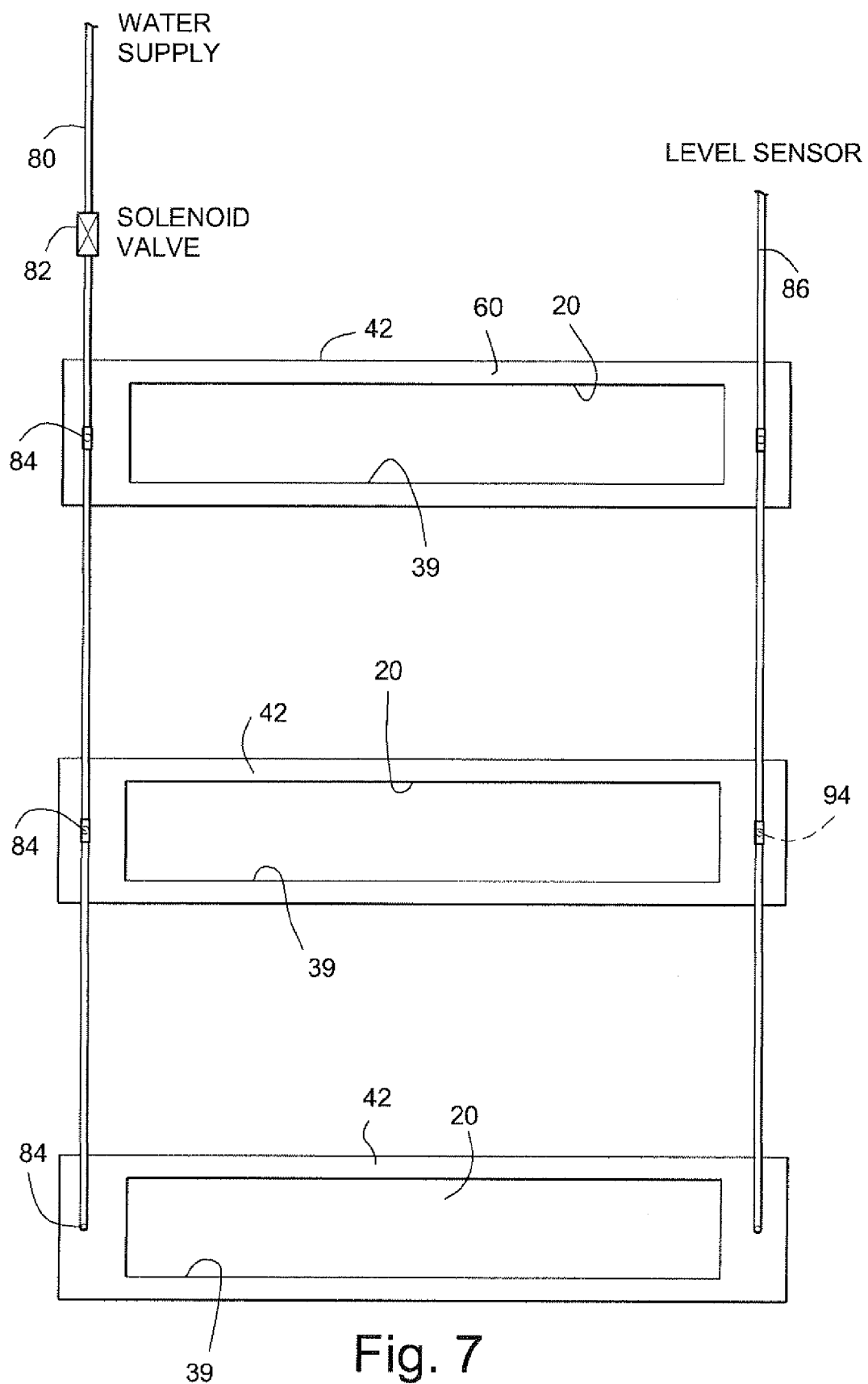
FIG. 7 is a schematic illustration in plan of a sealing fluid supply system for the gates and a fluid level sensor system therefor.

Referring now to FIG. 7, there is illustrated a sealing system for the hopper openings 20 and chute openings 39 when the gates are closed. In FIG. 7, gate members 42 are illustrated and the openings 20 and 39 are superimposed in plan on the concave upper surface of the gate members 42. It will be appreciated that when storing particulate material, e.g., asphaltic cement or mix, oxidation of the asphalt mix may occur if oxygen is permitted to migrate into the silo. Oxidized asphaltic mix creates hardened chunks of material which will plug the silo discharge openings and/or cause a quality problem when using the mix in a paving operation.

Referring particularly to FIG. 7, the gate members 42 are sized to have peripheral margins 60 which lie outwardly of the openings 20 and 39. That is, the clam gate members are wider and longer than the actual silo outlet openings 20 and 39. This enables a sealing liquid, e.g., water to be disposed on and carried by the gate member 42. That is, water disposed on the concave gate member 42 would flow toward the chute opening 39 and submerge the gap between the concave gate surface and the margin of the chute defining opening 39. The water will also penetrate the hot mix at the lower end of the chute 32. Because of its contact with the hot gate member 42 and hot mix, a large portion of the water will convert to steam. The steam will blanket the area and migrate up through the mix in the silo. The silo will thus seal any air containing oxygen away from the hot mix. The steam will not oxidize the asphalt mix and the water will cool the mix which is in immediate contact with the gate area. Because of the low thermal conductivity of the hot mix, only a very small portion of the mix at the end of the outlet chute 32 will be cooled significantly. Heating elements 62 (FIG. 8) are placed on the outer surface of the gate members 42 to maintain the member at about 200° F., which is a sufficiently elevated temperature to enable the hot mix to flow out of the silo once the gate is opened but also a sufficiently cool temperature that the water will not boil. Traditional heaters may be provided along the outside surfaces of the flat plates forming the hoppers to assist in maintaining the asphaltic mix inside the silo to a proper temperature.

Figure 8:
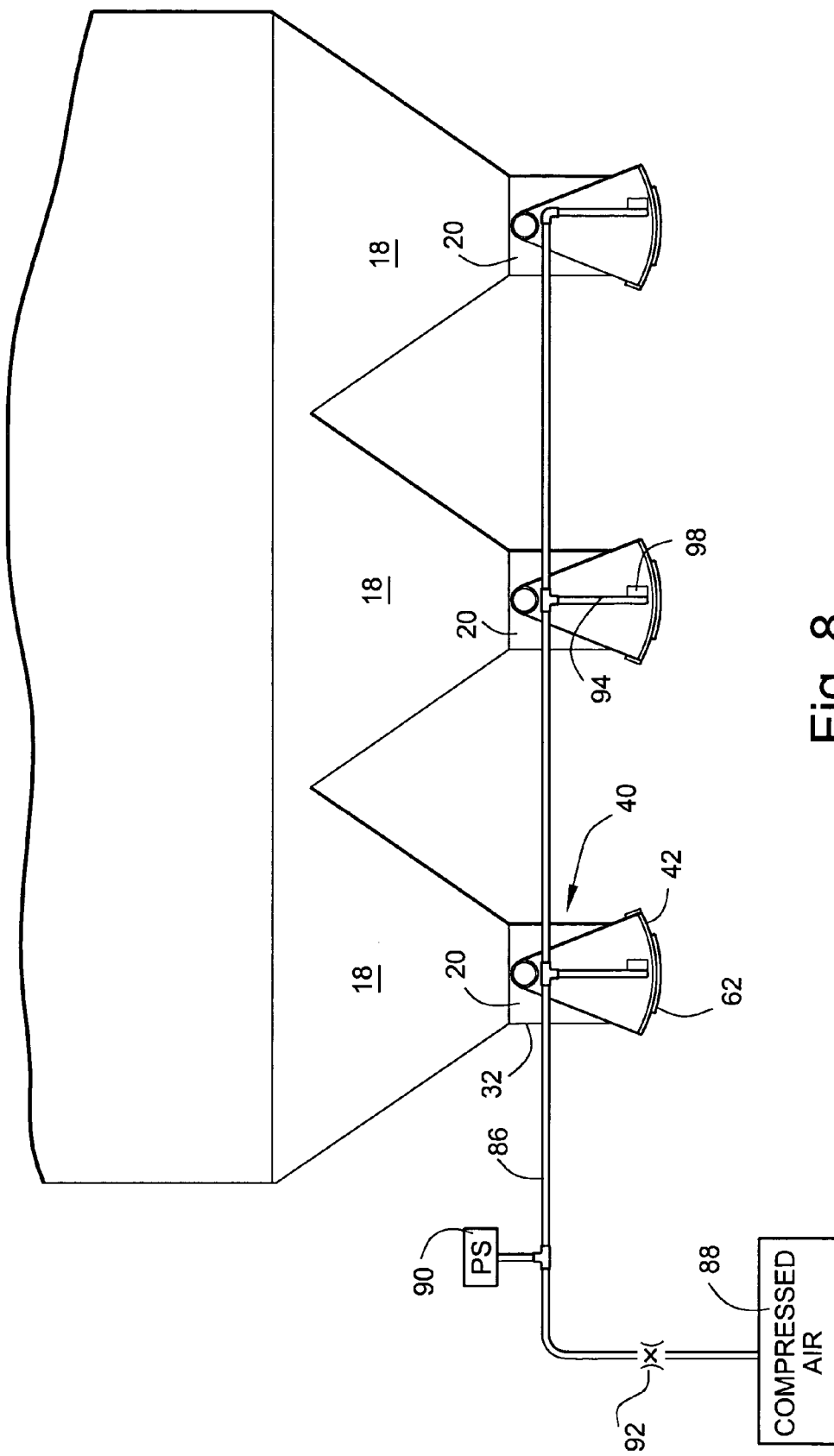
FIG. 8 is a side elevational view of the fluid level sensor system.

In FIGS. 7 and 8, the sealing system is illustrated in detail. While other types of fluids may be used in the sealing system, water is preferred. Thus, a water supply pipe 80 having a solenoid actuated valve 82 extends over like ends of the gate members 42 at one end of the hoppers. Pipes 84 are connected to the water supply pipe 80 for supplying water directly into the arcuate gate member 42. At the opposite end of the gate members 42, a water level sensor system is provided to measure the level of the water in the gates. The sensing system as well as the water supply system are in areas of the gates outside of the chute openings. The level sensor system includes a pipe 86 coupled to a source of compressed air 88 (FIG. 9), the pipe having a pressure switch 90. Compressed air is fed along pipe 86 through an orifice 92 to control consumption. Pipe 86 is coupled to troughs formed by the concave arcuate members 42 of the gates by pipes 94 which terminate close to the bottom of the troughs.

As the water is supplied and fills the gate members 42, it will run from one end of the gate to the other end and begin to submerge the ends of the pipes 94. Once the water level in all of the gates exceeds a predetermined magnitude, a back pressure develops in the air supply pipe 86 and trips the pressure switch 90. Pressure switch 90 then closes the solenoid valve 82, thereby cutting off the water supply to the gates. As the water evaporates, the level will fall and the pressure switch 90 will then open the solenoid valve to restore the level. Consequently, with the water seal, oxygen from the atmosphere does not migrate into the silo and the deleterious effects of oxidation of the asphaltic hot mix are entirely avoided.

In addition to the water level control, temperature sensing devices, e.g., thermocouples, 98 (FIG. 8) are provided at the ends of the pipes 94. During long term storage periods, the thermocouples may control the operation of the gate heaters 62 to maintain a constant temperature just below the boiling point of the water. Once the storage period is completed, a valve shuts off the water supply to the gates and the gate heaters are restored to normal operating mode whereby they are run continuously with the water being boiled off and the hot mix in the gate chutes elevated in temperature in preparation for loading a truck.

Figure 2:
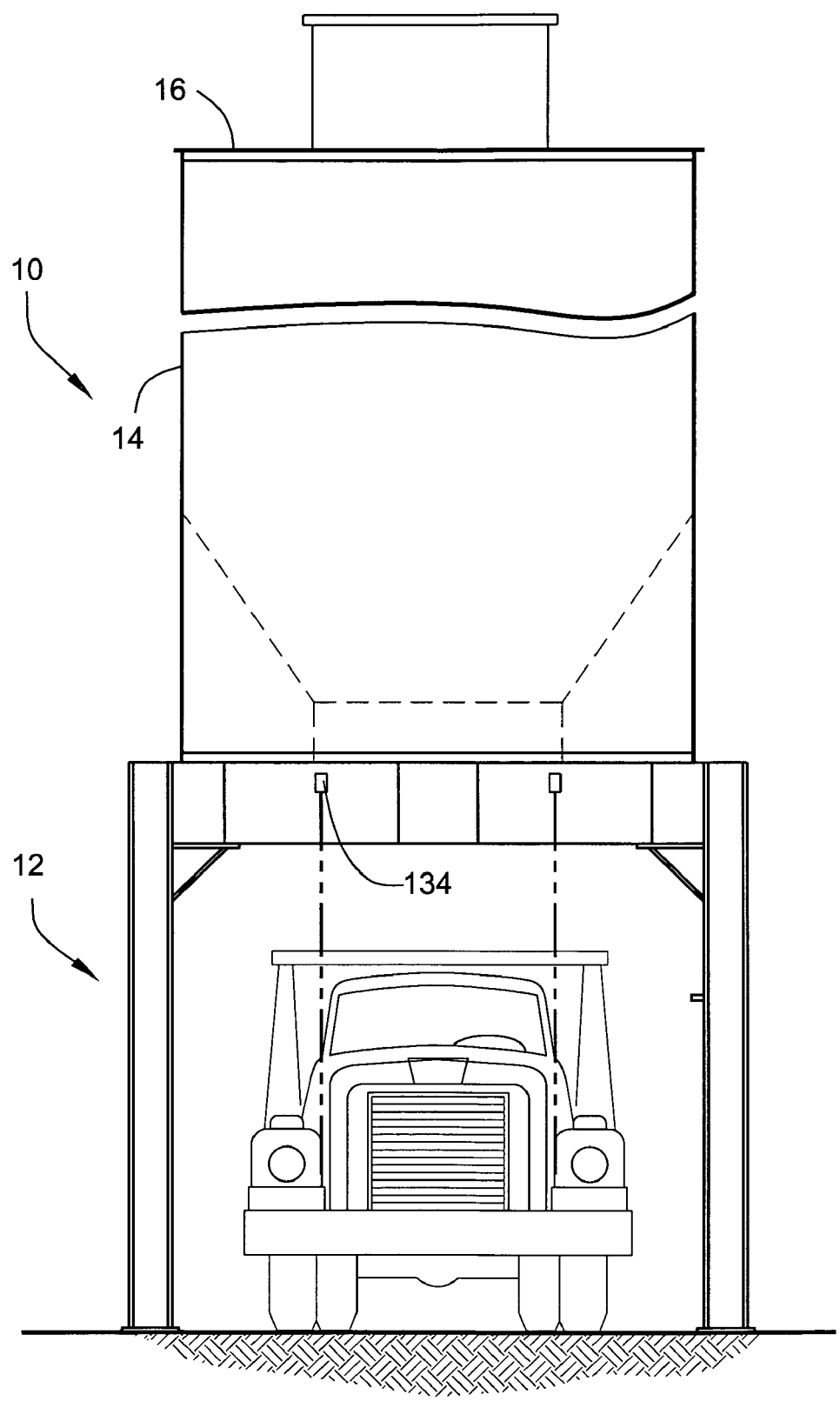
FIG. 2 is a front elevational view thereof.
Figure 9:
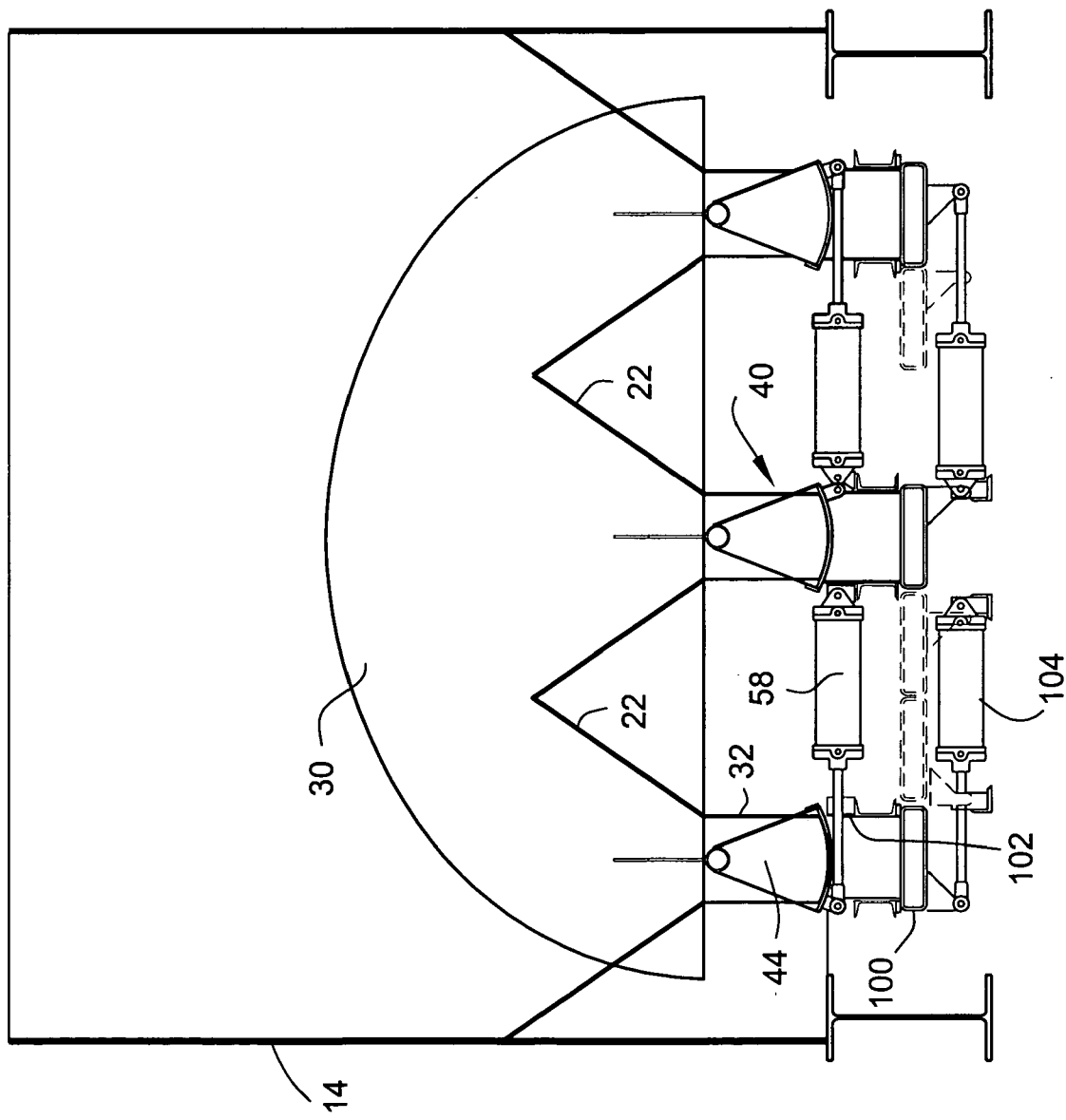
FIG. 9 is a view similar to FIG. 3, illustrating safety gates below the clam gates.

Referring to FIG. 9, there are illustrated safety gates 100 for disposition below the hopper openings 20, the chute openings 39 and the clam gates 40. Chute extensions 102 are spaced below the chutes 32 and form a rectilinear continuation of the chutes 32. The spacing between chutes 32 and extensions 102 leaves an opening for the safety gate 100 to open and close the opening. Chute extensions 102 are formed from two elongated plates and two end plates to form a rectilinear box-like chute extension. At the lower end of each extension 102 is a safety gate 100 which is slidable longitudinally (in the direction of truck ingress and egress to and from below the hopper and chute openings 20 and 39, respectively, compare FIGS. 1 and 2). Each of the safety gates 100 is movable linearly between chute extension closed and open positions by fluid actuated cylinders 104. Preferably cylinders 104 are air actuated, and one cylinder is provided each safety gate 100. Thus, the safety gates as well as the clam gates can be operated independently.

Figure 10:
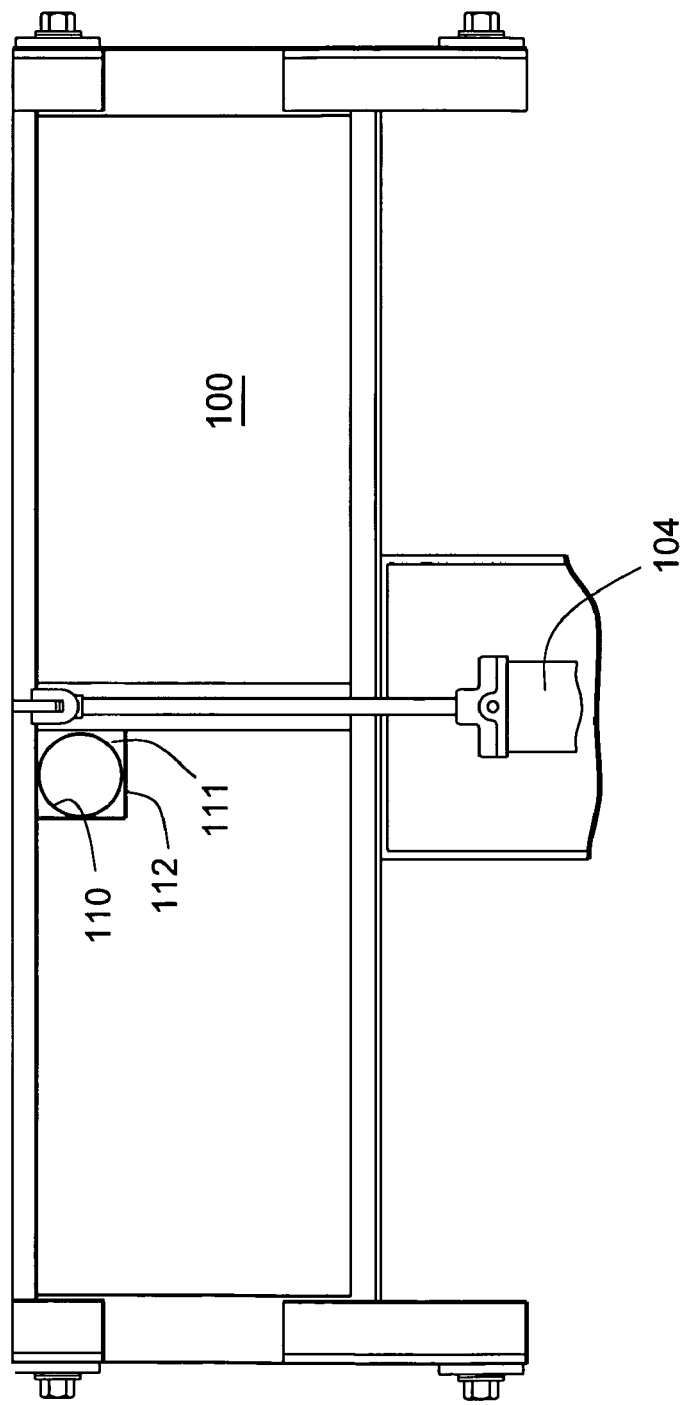
FIG. 10 is a bottom view of the safety gate assembly.
Figure 11:
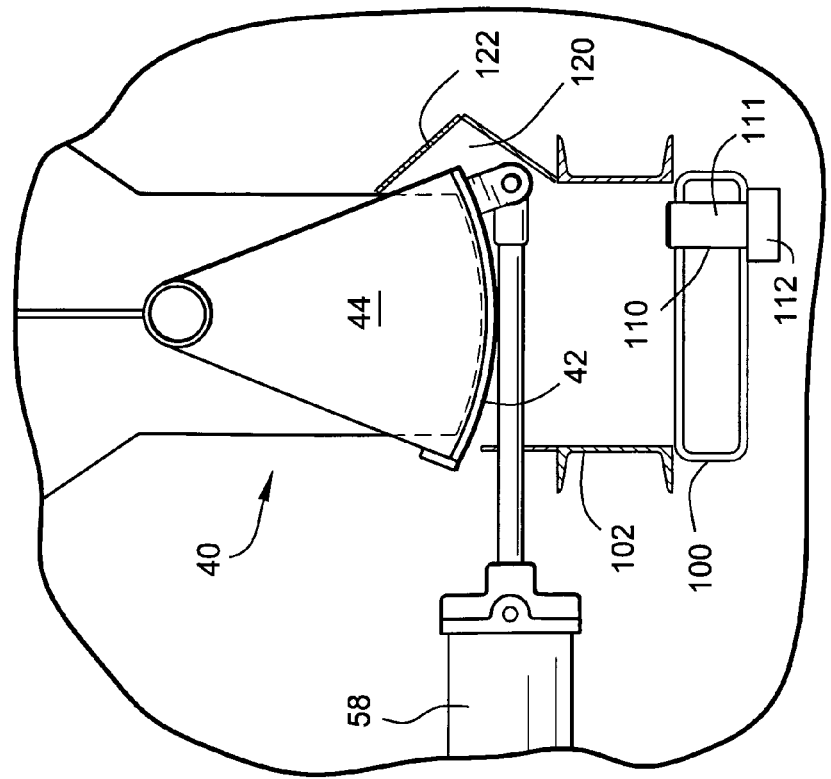
FIG. 11 is an enlarged fragmentary side elevational view illustrating rodding ports in conjunction with a clam gate.

Referring now to FIGS. 10 and 11, each of the safety gates 100 has a rodding port 110. The rodding port comprises a pipe 111 extending through the safety gate and a cap 112 at its lower end. It will be appreciated that the rodding port 110 is aligned with the chute 32 when the safety gate is in a closed position and the gate 40 is in an open position. Should the material of the silo choke the hopper openings 20 and/or the chutes 32 and not flow, the clam gates may be opened while maintaining the safety gates closed. A rod may be disposed through the rodding port 110 upwardly into the opening and hopper to loosen the material. By maintaining the safety gate in the closed position and providing only a small opening for the rod, the material, when broken up, will not flow out of the silo. It will also be appreciated that more than one rodding part may be provided in any one safety gate.

Additionally, as illustrated in FIGS. 6 and 11, there is illustrated a diversion cavity. The diversion cavity 120 is formed by a pair of angled plates 122 disposed along the leading edge of the clam gate when moving toward the gate closed position and between the lower end of the chute 40 and the chute extension 102. The diversion cavity 122 prevents the material when closing the clam gates from being forced off the leading edge of the gate member 42 back into the silo hopper. Rather, the diversion cavity 120 accepts the material being forced by the closing movement of the gate member and permits that material to fall back into the extension chute for discharge.

Figure 5B:
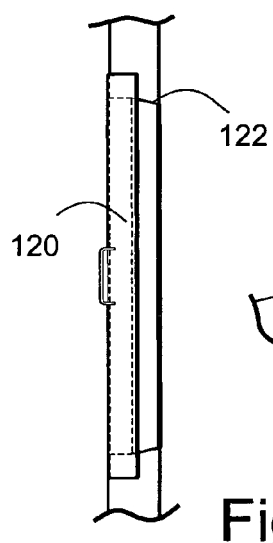
FIGS. 5B and 5C are fragmentary cross-sectional views illustrating an access door for the silo.
Figure 5C:
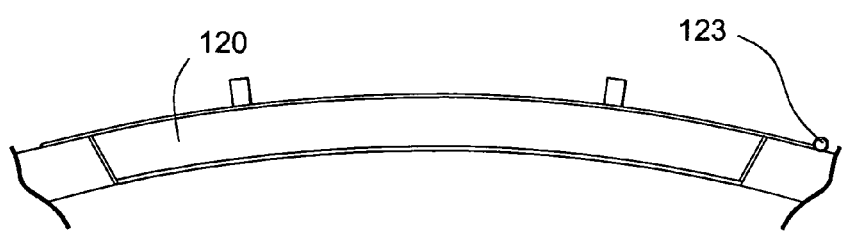

It will be appreciated that silos, particularly silos for storing asphaltic mix, wear over time and need to be lined. Because of the present triple gate design and the 12 inch wide openings 20, a maintenance individual cannot gain access to the interior of the hopper 18 by going up through the discharge openings. Consequently, and referring to FIGS. 5A-5C, there is provided a hinged access door. The access door is provided in the cylindrical side wall of the silo above the hopper area. The door 120 has sides that are tapered inwardly so that as the door is pivotally closed about hinges 123 along an end of the door, it will wedge into the receiving tapered frame of the silo to provide sealing as illustrated at 122 in FIG. 5B. A further advantage of the triple gate design is that the gates provide 1×6 foot openings, enabling plates as wide as six feet to be raised through the gates for use in repairs. This enables quicker installation and repairs.

Referring back to FIGS. 1 and 2, it will be appreciated that the openings 20 and 39 have length directions which extend transverse or laterally of the width of the loading area 12 and hence the width of the truck bed. With the foregoing described three hopper, triple gate and three opening design, and with the outermost openings 20 and 39 lying approximately eight feet apart centerline to centerline, a conventional tri-axial dump truck with a 14-16 foot truck bed length may be located with the bed on the center of these gates. This enables the truck to be loaded evenly without requiring the truck to move as previously noted. Further, the open area of the gates is significantly larger than conventional discharge outlets of hot mix silos which enable extremely rapid loading of the truck. For example, in tests, it has been determined that a standard truck load of 18 to 20 tons of material can be loaded in under six seconds using the present discharge system. This not only increases productivity of the trucks in moving them in and out of the plant, but also reduces segregation of the material. Independent operation of each of the three hoppers, particularly the clam type gates, enables loading to the proper weight. That is, the loads the truck may carry have limits. Since the three gates are operated independently, the preferred mode of operation is to open all of the gates simultaneously at the beginning of the load-out. The two outer gates would then be closed once the truck scale reaches a nominal weight. When the outer gates are closed, the center gate may remain open until the weight reaches the limit taking into account the freefall amount of material that has left the gate but not yet reached the truck bed.

Because the conventional dump truck bed is eight feed wide, approximately six foot long gates are provided. This avoids load-out laterally beyond the width of the truck bed and also permits appropriate fall of the material onto the truck bed. One embodiment of the invention provides for a center gate opening shorter in length than the 1×6 foot opening of the outer openings 20. Thus, the center gate opening can be made 1×4 feet instead of 1×6 feet which enables not only more accurate control of the freefall amount and the final load weight but also enables a plant operator to load narrower trucks such as conventional pickup trucks by using only the single center gate.

Figure 12:
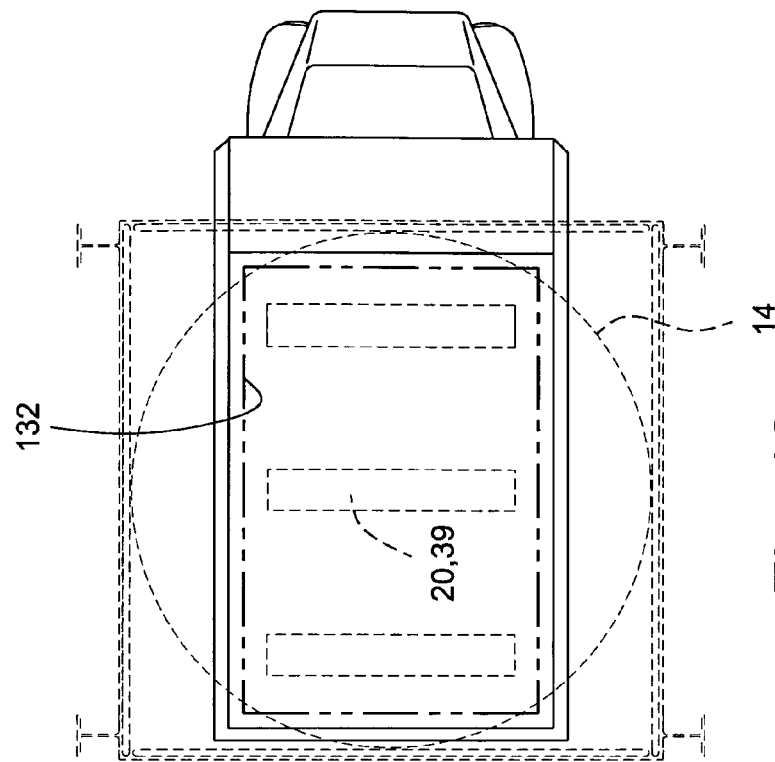
FIG. 12 is a schematic plan view illustrating the relation between the gate openings, truck bed and a laser light pattern for determining the position of the truck bed vis-a-vis the gate openings.

Referring to FIG. 12, it will be appreciated that the outlet pattern of the openings 20 and 39 is essentially contained in a rectangular region surrounding the openings and considering the spread of the material both laterally and longitudinally during flight from the openings into the truck bed. Thus, light beams, for example, visual laser beams displaying a pattern indicated by the dashed lines 132, may project from the bottom of the silo into the loading area to produce a band or points of light defining the periphery of a leading envelope, preferably marginally outside of this rectangular region. The light beams project from laser beam emitters 134 (FIGS. 1 and 2) mounted on the lower end of the silo and project a light pattern outboard of the rectangular outlet region to provide visual confirmation that the truck bed has been located properly in the loading area. By locating a camera above the truck bed or requiring the driver to look down into the bed, the rectangular pattern 132 defined by the light beams is identified and should be contained inside the truck bed as illustrated. For example, with a normal dump truck bed of about eight feet wide with six foot wide openings 20, light beams set at a seven foot width would produce a pattern contained within the truck bed area. If the pattern of light occurs outside of the truck bed, the driver would recognize the need to move the truck as necessary to locate the light pattern within the rectangular confines of the truck bed. Thus, the use of this lighting system facilitates locating the truck properly in the loading area for fast loading.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Storage and discharge apparatus for particulate material, comprising:
   a silo;
   at least three hoppers adjacent a lower end of said silo with each hopper being in the form of an inverted, four-sided frustum terminating in a generally rectilinear bottom discharge opening;
   said openings being generally parallel to one another and being spaced from one another in a direction normal to length directions of the openings; and
   a gate for each opening movable between open and closed positions, wherein each said gate includes an elongated arcuate closure member pivotally carried by said silo for movement between said open and closed positions, each said member in the closed position having a margin extending peripherally about said opening and a gap between said members and said opening, an inlet for supplying a fluid to the margin of each member for submerging the gap between the gate members and the opening, thereby sealing the material in the hopper adjacent the opening from atmosphere.

2. Apparatus according to claim 1 wherein each said member includes a heater element for maintaining the material adjacent the hopper opening at an elevated temperature.

3. Apparatus according to claim 1 including a pipe for supplying water to said inlets and a valve for regulating the flow of the water through said pipe, and a water level sensor for sensing the level of the water supplied to each member and controlling the valve to regulate the supply of water to the members and the level of water in each member.

4. Storage and discharge apparatus for particulate material, comprising:
   a silo;
   at least three hoppers adjacent a lower end of said silo with each hopper being in the form of an inverted, four-sided frustum terminating in a generally rectilinear bottom discharge opening;
   said openings being generally parallel to one another and being spaced from one another in a direction normal to length directions of the openings; and
   a gate for each opening movable between open and closed positions, wherein each said gate includes an elongated arcuate closure member pivotally carried by said silo for movement between said open and closed positions, and actuators coupled to said members, respectively, for moving said members independently of one another, and including a safety gate below each of said openings and corresponding gate member, a port in each said safety gate for insertion of a rod through said port and into said opening when said closure member lies in an open position to enable break-up of material plugging said opening by manipulation of the rod.

5. Apparatus for storing and discharging hot asphaltic mix, comprising:
a silo;
at least one hopper adjacent a lower end of said silo and terminating in a bottom discharge opening;
a gate for said opening movable between open and closed positions, said gate including an elongated arcuate closure member pivotally carried by said silo for movement between said open and closed positions, and fluid actuated cylinders coupled to said member for moving said member between said open and closed positions;
a safety gate below said opening and said gate member including a port in said safety gate for insertion of a rod through said port and into said opening when said closure member lies in an open position to enable break-up of material plugging said opening by manipulation of said rod.

6. A method for storing and discharging asphaltic mix from a silo comprising the steps of:
providing a silo that defines a storage space for storing the asphaltic mix;
forming at least three hoppers adjacent a lower end of the silo in direct communication with said storage space and terminating in a generally elongated rectilinear bottom discharge opening;
providing a generally rectilinear truck loading area below said silo and said openings with a length direction thereof perpendicular to the length directions of said hoppers and said openings; and
substantially simultaneously opening gates normally closing said openings to discharge the asphaltic mix from the silo and hoppers through said openings substantially simultaneously into a truck bed disposed in the loading area.

7. A method according to claim 6 wherein the truck has a generally rectilinear truck bed and including the step of orienting the truck in the loading area with the length direction of the truck bed parallel to the length direction of the rectilinear loading area and perpendicular to the length directions of said hoppers and said openings.

8. A method according to claim 6 wherein said gates comprise clam gates with upwardly directed concave surfaces facing said openings, and supplying a sealing fluid to said surfaces to seal the asphaltic mix from the atmosphere in the region of the openings.

9. A method according to claim 8 including regulating the supply of fluid to said members.

10. A method according to claim 6 wherein the step of substantially simultaneously opening said gates comprises substantially simultaneously opening the three gates to discharge asphaltic mix from the three hoppers and subsequently closing the outermost gates while maintaining the center gate open to discharge asphaltic mix from the center hopper.

11. A method according to claim 10 including closing the outermost gates in response to discharging a predetermined quantity of mix from the hoppers and closing the center gate in response to discharge of mix until a selected truck weight is obtained.

12. A method for storing and discharging asphaltic mix from a silo comprising the steps of:
providing a silo defining a storage space for storing the asphaltic mix;
providing at least a pair of hoppers adjacent a lower end of the silo in direct communication with said storage space and terminating in a bottom discharge opening;
providing a generally rectilinear truck loading area below said silo and said openings with a length direction thereof perpendicular to the length directions of said hoppers and said openings;
substantially simultaneously opening gates normally closing said openings to discharge the asphaltic mix from the silo and hoppers through said openings substantially simultaneously into a truck bed disposed in the loading area; and
closing one of said gates and maintaining another of said gates open to discharge asphaltic mix from the silo through said another open gate.

13. A method according to claim 12 wherein the truck has a generally rectilinear truck bed and including the step of orienting the truck in the loading area with the length direction of the truck bed parallel to the length direction of the rectilinear loading area and perpendicular to the length directions of said hoppers and said openings.

14. A method according to claim 12 wherein said gates comprise clam gates with upwardly directed concave surfaces facing said openings, and supplying a sealing fluid to said surfaces to seal the asphaltic mix from the atmosphere in the region of the openings.

15. A method according to claim 12 including providing a third hopper adjacent a lower end of the silo terminating in a bottom discharge opening extending in the length direction of and intermediate said pair of hoppers.

* * * * *